United States Patent
Glover et al.

(10) Patent No.: US 11,885,222 B2
(45) Date of Patent: Jan. 30, 2024

(54) INCLINATION-BASED LEVELLING SYSTEM

(71) Applicants: Caterpillar Global Mining Equipment LLC, Denison, TX (US); Caterpillar Global Mining HMS GmbH, Dortmund (DE)

(72) Inventors: Rex Aaron Glover, Deer Creek, IL (US); Timo Diekmann, Castrop-Rauxel (DE)

(73) Assignee: Caterpillar Global Mining Equipment LLC, Denison, TX (US)

( * ) Notice: Subject to any disclaimer, the term of this patent is extended or adjusted under 35 U.S.C. 154(b) by 728 days.

(21) Appl. No.: 17/034,936

(22) Filed: Sep. 28, 2020

(65) Prior Publication Data

US 2022/0098930 A1   Mar. 31, 2022

(51) Int. Cl.
*E21B 7/02* (2006.01)
*E21B 44/00* (2006.01)
*E21B 15/00* (2006.01)
*G05B 19/042* (2006.01)

(52) U.S. Cl.
CPC .............. *E21B 7/024* (2013.01); *E21B 7/022* (2013.01); *E21B 15/00* (2013.01); *E21B 44/00* (2013.01); *G05B 19/0426* (2013.01); *G05B 2219/45129* (2013.01)

(58) Field of Classification Search
CPC .......... E21B 7/024; E21B 7/022; E21B 15/00; E21B 15/003; E21B 44/00; G05B 19/0426; G05B 19/048; G05B 2219/45129
USPC ......................................................... 52/122.1
See application file for complete search history.

(56) References Cited

U.S. PATENT DOCUMENTS

| | | | |
|---|---|---|---|
| 10,597,994 B2 | 3/2020 | Allen et al. | |
| 2011/0112728 A1* | 5/2011 | Stacy, II | B66C 23/80 701/49 |
| 2011/0162888 A1* | 7/2011 | McHugh | E21B 44/02 175/26 |
| 2021/0010329 A1* | 1/2021 | Pyke | E21B 7/025 |
| 2021/0017848 A1* | 1/2021 | Gunda | E21B 44/02 |

FOREIGN PATENT DOCUMENTS

WO   WO 2018001506 A1   1/2018

\* cited by examiner

*Primary Examiner* — Mark R Wendell (57) ABSTRACT

A drilling machine includes an inclination-based levelling system. The drilling machine includes a frame with front and rear portions, and a plurality of support jacks including a pair of rear jacks proximate the rear portion of the frame and a front jack proximate the front portion of the frame. Each jack is extendable and retractable. The drilling machine also includes a sensor configured to monitor and transmit sensor data, the sensor data including at least one of a roll of the drilling machine and a pressure. A controller operatively associated with the sensor, is configured to calculate a volume of debris to be produced during an operation of the drilling machine, to select a machine height setting based on the calculated volume of debris, and to extend and retract the plurality of support jacks according to the selected machine height setting.

9 Claims, 6 Drawing Sheets

INCLINATION-BASED LEVELLING SYSTEM

TECHNICAL FIELD

The present disclosure generally relates to drilling machines and, more specifically, to systems and methods for levelling drilling machines.

BACKGROUND

Drilling machines may be used for sub-surface mineral extraction, such as, e.g., oil or natural gas; mineral exploration or environmental exploration drilling; hydraulic fracturing; oil, gas, and/or water extraction wells; rock cut drilling for mining and/or quarrying operations; and the like. Mobile drilling machines, such as blasthole drilling machines, are typically used for drilling blastholes for mining, quarrying, dam construction, and road construction, among other uses. The process of excavating rock, or other material, by blasthole drilling is known to generate large amounts of dust and debris, especially on encountering hard and abrasive rocks.

Various dust control systems and methods have been developed for suppressing the amount of dust and debris that may escape from an underside of the drilling machine during a drilling operation. Water spray or injection, for example, may be used to control smaller airborne dust particles, while dust hoods or flaps may be used to restrict or direct the spread of dust and larger debris accumulating under the drilling machine itself. However, the volume of dust and debris expelled during operation often exceeds the confines of the dust hood. When this happens, excessive fallback will occur when retracting the drill bit from the hole.

Levelling the drill deck of the drilling machine at a greater height from the work surface not only increases the volume of space available within the dust hood, but also permits expelled debris to spread beyond the limits of the dust hood. This decreases the amount of fallback when retracting the drill bit from the hole, and maintains an accurate hole depth, resulting in less re-drilling and better blast quality. However, typical machine levelling systems restrict jack extension, permitting the jacks to extend only as far as necessary to bring the machine into a levelled and stable state, and not further. This results in a drilling machine that sits low to the work surface, and leaves the operator without an option to extend the jacks further.

Prior attempts to develop systems for levelling drilling machines have been directed to corrective levelling systems. For example, U.S. Pat. No. 10,597,994 discloses a system directed toward detecting jack drift during operation of the drilling machine. The system initially levels the drilling machine prior to a drilling operation. The system then monitors the position of each jack, using a position sensor, throughout the drilling operation. If the system detects jack drift or jack leakage, the system adjusts the jacks and consequently re-levels the drilling machine during the drilling operation.

There is consequently a need for an improved levelling system for a drilling machine.

SUMMARY

In accordance with one aspect of the present disclosure, a drilling machine with an inclination-based levelling system is disclosed. The drilling machine may include a frame with a front portion and a rear portion. The drilling machine may also include a plurality of support jacks with a pair of rear jacks proximate the rear portion of the frame and a front jack proximate the front portion of the frame, and each jack being adjustable between a fully retracted position and a fully extended position. A sensor may be configured to monitor and transmit sensor data including at least one of a roll of the drilling machine and a pressure. A controller, including a processor, may be operatively associated with the sensor. The controller may be configured to calculate a volume of debris to be produced during an operation of the drilling machine, to select a machine height setting based on the calculated volume of debris, and to extend and retract the plurality of support jacks according to the selected machine height setting using the sensor data.

In accordance with another aspect of the present disclosure, an inclination-based levelling system for use with a drilling machine is disclosed. The drilling machine may include a frame and a plurality of support jacks. The inclination-based levelling system may include a sensor configured to monitor and transmit sensor data, the sensor data including at least one of a roll of the drilling machine and a pressure. The inclination-based levelling system may further include a controller, including a processor, in operative communication with the sensor. The controller may be configured to calculate a volume of debris to be produced during an operation of the drilling machine, select a machine height setting based on the calculated volume of debris, receive the sensor data transmitted by the sensor, and extend and retract the plurality of support jacks according to the selected machine height setting using the received sensor data.

In accordance with yet another aspect of the present disclosure, a method of levelling and raising a frame of a drilling machine is disclosed. The drilling machine may include a plurality of support jacks. The method may include calculating a volume of debris to be produced during an operation of the drilling machine, and selecting a machine height setting based on the calculated volume of debris. The method may also include receiving pressure sensor data from a plurality of pressure sensors, wherein each pressure sensor may be coupled to one of the plurality of support jacks, and receiving roll data from a roll sensor coupled to the frame of the drilling machine. Furthermore, the method may include levelling the frame of the drilling machine using the received pressure sensor data and the received roll data, and extending and retracting each of the plurality of support jacks according to the selected machine height setting using the received pressure sensor data and the received roll data.

These and other aspects and features of the present disclosure will be better understood upon reading the following detailed description, when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
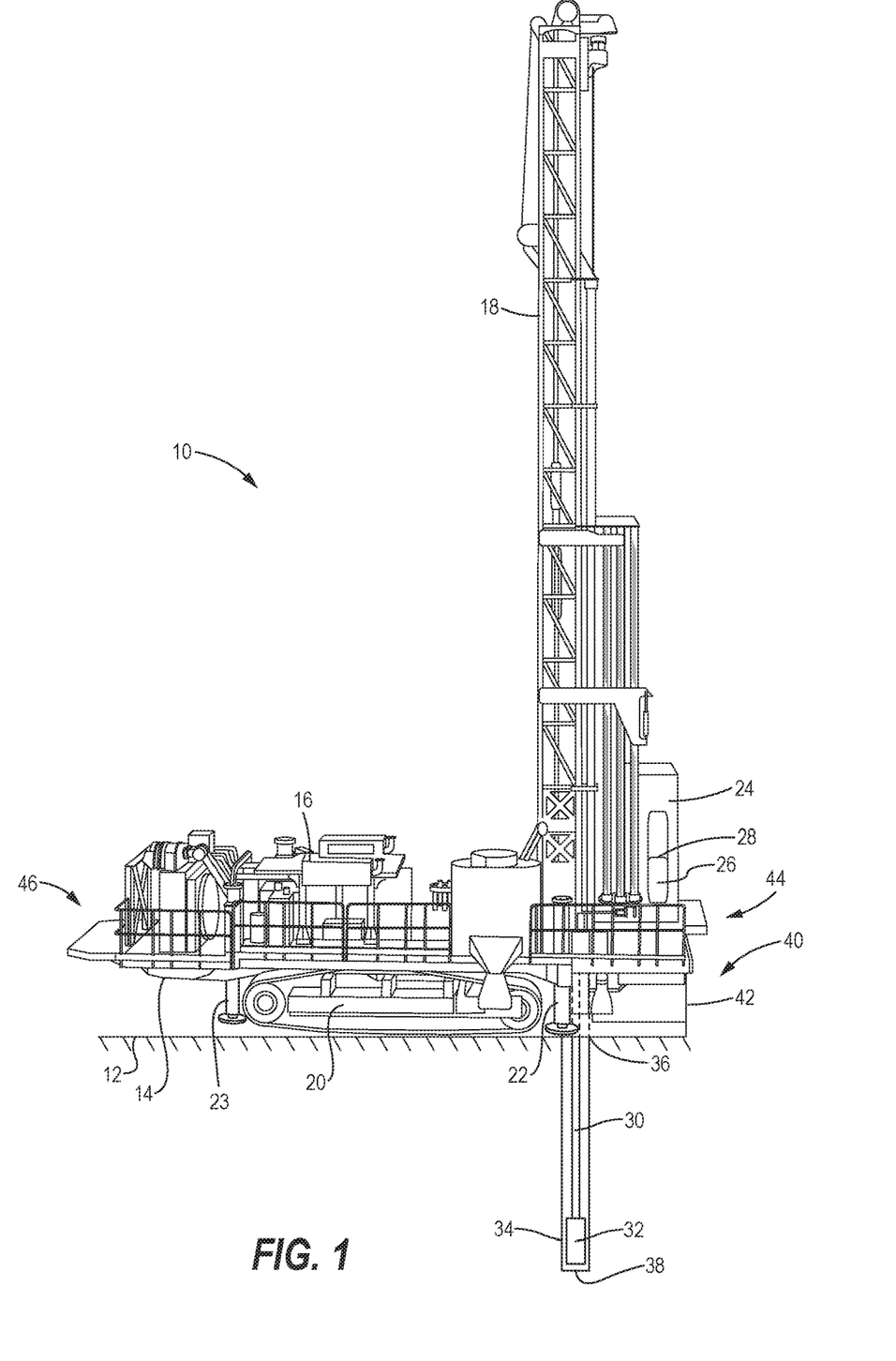
FIG. 1 is a side perspective view of a drilling machine at a work site, in accordance with an embodiment of the present disclosure.

Referring now to FIG. 1, an exemplary drilling machine 10 operating at a worksite is illustrated. While the drilling machine 10 illustrated in FIG. 1 is a rotary blasthole drill rig, the features disclosed herein may be utilized with other types of drilling machines for drilling or otherwise forming holes, channels, tunnels or openings into, within, and/or extending into and/or below a work surface 12 of the worksite. However, it should be understood that the spirit and scope of the present disclosure includes any machine, machine system, or application which can implement the system and method for levelling the drilling machine according to any embodiment of the present disclosure, including, but not limited to, types of drilling machines which can vary from the drilling machine 10 illustrated in FIG. 1.

The drilling machine 10 includes a frame 14, a power source 16, and a mast 18. The mast 18 may be mounted to the frame 14 and supported about a pivot (not shown). To effectuate one or more of movement, turning, positioning, and travel of the drilling machine 10 on the work surface 12, the frame 14 may be supported by at least one ground engaging mechanism 20. While the present drilling machine 10 is illustrated with a pair of endless track assemblies, the ground engaging mechanisms 20 may be of any suitable type, including wheels. Other machines (e.g. marine-based drilling machines), on the other hand, may not require or utilize any ground engaging mechanism 20. The drilling machine 10 may further include one or more front jacks 23 and one or more rear jacks 22, each of which may be extended and/or retracted to support and/or stabilize the drilling machine 10 on the work surface 12 during operation.

With continued reference to FIG. 1, the power source 16 may be mounted on the frame 14, and may include any suitable power source or system capable of generating and/or supplying power to operate the drilling machine 10, as well as its systems and components thereof, as disclosed herein. Non-limiting examples of the power source 16 may include, for example, a diesel engine, a gasoline engine, a gaseous fuel-powered engine, an electrical motor, a fuel cell, a battery, and/or combinations thereof. The frame 14 may also support batteries, pumps, air compressors, hydraulic fluid storage and other machinery that is not specifically numbered, which is necessary to power and operate the drilling machine 10.

In the illustrated embodiment, the drilling machine 10 is an operator operated machine, and thus includes an operator cab 24. However, in various other embodiments, the drilling machine 10 may be an autonomous machine, a semiautonomous machine, a remotely operated machine, or a remotely supervised machine, among others. The operator cab 24 may be mounted to the frame 14, and may include one or more control devices 26 that a user or operator may use to maneuver and control the drilling machine 10. These control devices 26 may include one or more joysticks, pedals, levers, buttons, steering wheels, or any other suitable control device or interface (or any of various combinations thereof) configured to be actuated or otherwise engaged to effectuate control of the drilling machine 10. The operator cab 24 may also include a control panel 28 for displaying visual data pertaining to the components and/or the current operations of the drilling machine to the operator stationed within the operator cab. The control panel may be included as a control device 26 when it is configured as a tablet computing device (or otherwise consistent therewith), such that, through the control panel, on-board controllers may be configured to receive control signals from an operator or from a remote location for interacting, controlling, and/or otherwise operating the drilling machine 10.

The drilling machine 10 further includes a rotatable drill string 30 of drilling pipe segments onto which a work tool 32 may be mounted for drilling into a hole 34 extending below the work surface 12. The hole 34 includes a top portion 36 at the work surface 12, and a bottom portion 38 at the depth of the work tool 32. The work tool 32 may be a drill bit or a bore bit. In various other embodiments, the work tool 32 may be any other work tool used in the performance of a work-related task. For example, the work tool 32 may include one or more of a blade, a shovel, a ripper, a dump bed, a fork arrangement, a broom, a grasping device, a cutting tool, a digging tool, a propelling tool, a bucket, a loader or any other tool known in the art.

Finally, the drilling machine 10 may include a dust containment assembly 40 provided below the frame 14, of the drilling machine. The dust containment assembly 40 may include one or more dust curtains and/or walls 42 that surround the top portion 36 of the hole. The drilling operation is consequently performed within the enclosure created by the dust containment assembly 40, proximate a front end 46 of the drilling machine 10.

Figure 2:
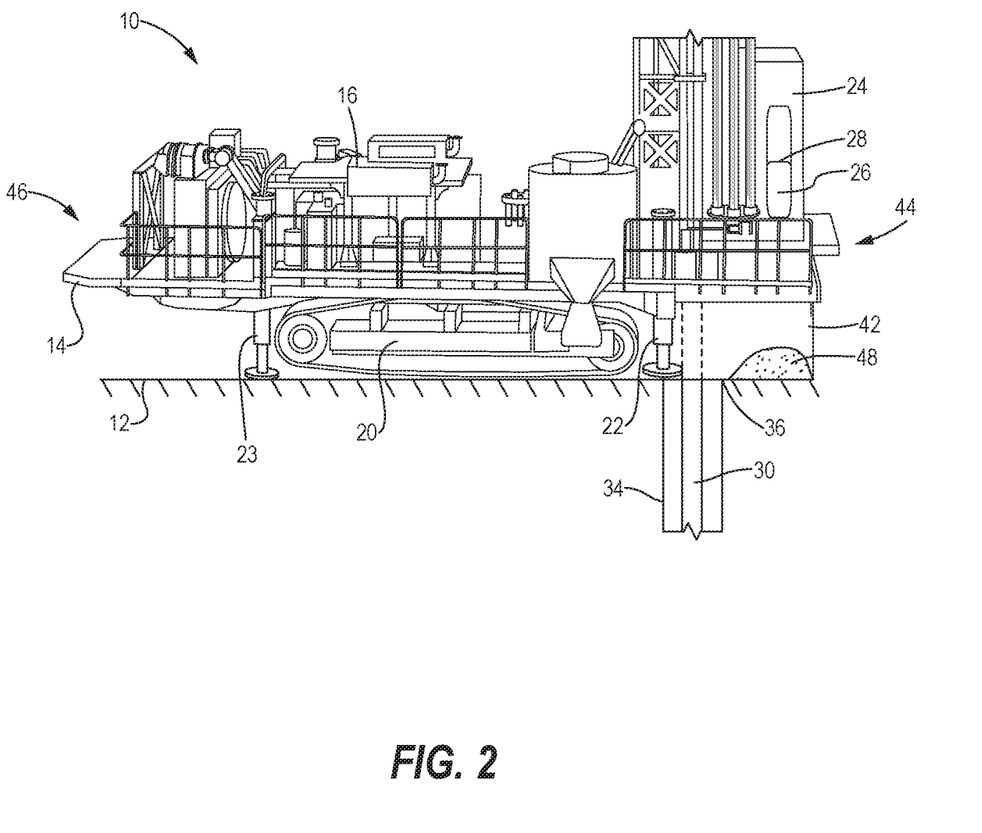
FIG. 2 is a side perspective view of a drilling machine at a work site, in accordance with an embodiment of the present disclosure.
Figure 3:
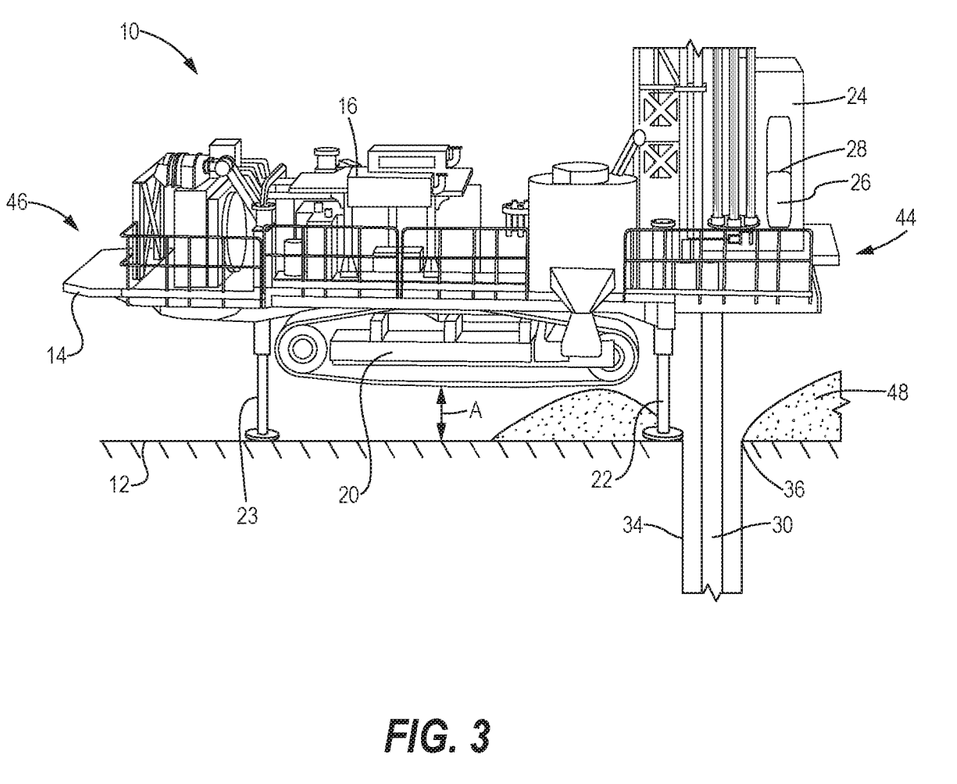
FIG. 3 is a side perspective view of a drilling machine at a work site, in accordance with an embodiment of the present disclosure.
Figure 4:
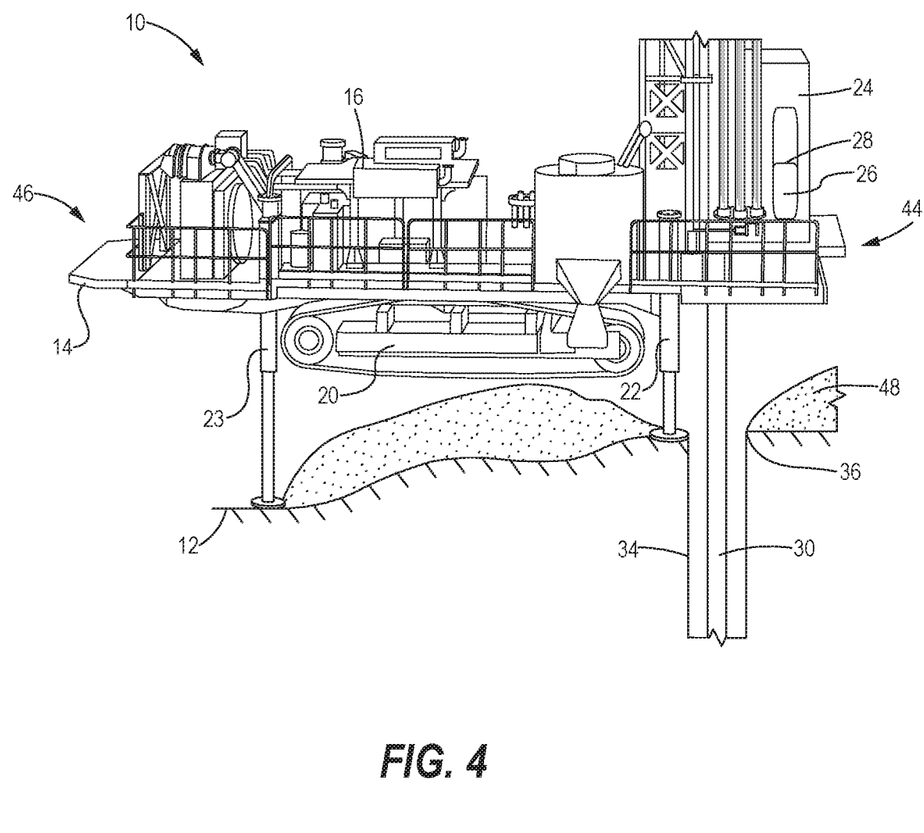
FIG. 4 is a side perspective view of a drilling machine at a work site, in accordance with an embodiment of the present disclosure.

Referring now to FIGS. 2 through 4, a portion of the drilling machine 10 is illustrated, including one front jack 23 and one rear jack 22. It should be understood that while one front jack 23 and one rear jack 22 are illustrated, in operation, a plurality of jacks may be used and positioned to appropriately level the drilling machine 10. The jacks 22, 23, which are mounted to, and extend through, the frame 14 of the drilling machine 10, can be selectively extended and retracted to raise and lower respective portions of the drilling machine. Specifically, the front jacks 23 may extend and retract to raise and lower the front end 46 of the drilling machine 10, and the rear jacks 22 may extend and retract to raise and lower a rear end 44 of the drilling machine.

During operation of the drilling machine 10, chips, dust and other drilling debris 48 accumulate under the rear end 44 of the drilling machine 10 as the debris is expelled from the hole 34 and contained by the dust containment assembly 40. Depending on the desired orientation of the frame 14 with respect to the work surface 12, as well as the anticipated volume of debris 48 to be expelled from the hole 34 during operation, the operator or an automated control system may manipulate the jacks 22, 23 to positions between, and including, fully extended and fully retracted positions. As such, the present drill machine includes an inclination-based levelling system 100 (FIG. 5) that, prior to the start of a drilling operation, calculates the volume of debris expected to be expelled during the drilling operation, and levels the drilling machine 10 to one of a low setting (see FIG. 2), a medium setting (see FIG. 3), and a high setting (see FIG. 4) in order to accommodate the calculated volume of debris under the frame 14 of the drilling machine. Alternatively, an operator of the drilling machine 10 may manually select from the low, medium and high setting using the control panel 28 in the operator cab 24.

Turning now to FIG. 2, the drilling machine 10 is illustrated in a low setting position, as determined by the inclination-based levelling system 100. In the low setting position, the jacks 22, 23 may be extended, such that the ground engaging mechanisms 20 may still be in contact with the work surface 12, or just slightly elevated from the work surface. The low setting may ensure a horizontal leveling of the frame 14 of the drilling machine 10, and may require firm ground contact of at least two rear jacks 22, and one front jack 23. As illustrated, the front and rear jacks 22, 23 are slightly extended, with the ground engaging mechanisms 20 slightly elevated from the work surface 12, and the frame 14 positioned level to a horizontal plane.

FIG. 3 illustrates the medium setting position, in which a ground clearance A distance may be required between the tracks 20 and the work surface 12. Specifically, once the inclination-based levelling system 100 or operator determines the medium setting position is required, the inclination-based levelling system adjusts the extension of the jacks 22, 23 in a three-phase operation. First, the initial phase, similar to the low setting position described above, ensures a horizontal levelling of the machine, with firm work surface 12 contact of at least two rear jacks 22, and one front jack 23. In the second phase, two rear jacks 22 of the drilling machine 10 are extended in a coordinated way to keep the roll of the drilling machine 10 close to zero, until a certain pitch of the drilling machine is reached. The roll and pitch of the drilling machine 10 is measured using at least one tilt sensor 50 positioned on the frame 14. The tilt sensor 50 may be an inclinometer, an accelerometer, or other sensor for measuring pitch and roll that is known in the art. Based on the distance of the rear jacks 22 to the front jack 23 the inclination-based levelling system 100 may correlate a certain pitch angle to a certain extension of the jacks 22, 23 and vice versa. In the final phase, the front jack 23 may be extended to bring the machine back to a horizontal, level position.

Finally, FIG. 4 illustrates the high setting position, which lifts the machine to a height that permits maximization of the stroke of at least one of the jacks 22, 23. Specifically, each jack 22, 23 includes a hydraulic jack cylinder (not shown) and at least one pressure sensor 52 disposed on, within, or proximate to the hydraulic jack cylinder in corresponding hydraulic fluid lines associated with a hydraulic fluid system (not shown) of the drilling machine. In one embodiment, two pressure sensors may be included on each jack 22, 23. Other sensors may also be used in association with the jacks 22, 23 to measure or sense an end of stroke or a ground contact force, among other things. In a manner similar to the medium setting position, firm work surface 12 contact of at least two rear jacks 22, and one front jack 23 may also be established in the high setting position. Similarly, the two rear jacks 22 of the drilling machine 10 may be extended together initially, and the at least one front jack 23 may then be extended to bring the machine to a horizontal, level position. Then, two rear jacks 22 of the drilling machine 10 may be extended in a coordinated way to keep the roll of the drilling machine 10 close to zero, until a certain pitch angle of the drilling machine is reached. In this high setting position, the pitch angle may be larger than that described in relation to the medium setting position, as the rear jacks 22 may extend further, raising the rear end 44 of the drilling machine 10 higher. As described above, the roll and pitch of the drilling machine 10 may be measured using at least one tilt sensor 50 positioned on the frame 14. Furthermore, at least one of the jacks 22, 23 may reach a fully extended position during the extension process. As illustrated in FIG. 4, for example, the high setting position may be particularly useful on an uneven work surface 12, enabling the debris 48 to easily spread out and away from the drilling hole 34. Once the two rear jacks 22 of the drilling machine 10 have been extended, the front jack 23 may be extended to bring the drilling machine back to a horizontal, level position.

In an alternative embodiment, when a high setting position is selected, the jacks 22, 23 may also be extended until at least one jack reaches a maximum extension or maximum stroke. In this embodiment, the rear jacks 22 may be extended while monitoring pressure data received from the pressure sensors 52. The rear jacks 22 may be extended until the pressure data indicates at least one of the jacks 22, 23 has reached a maximum stroke. Once this condition is met, the front jack 23 may be extended to return the drilling machine 10 to a horizontally level orientation. Further, the drilling machine may include two or more front jacks 23. In this embodiment, once the desired pitch angle has been reached or one of the jacks 22, 23 has reached a maximum stroke, the two or more front jacks 23 may be extended in a coordinated manner when bringing the drilling machine 10 back to a horizontal, level position such that the pressure in each front jack is equalized.

Figure 5:
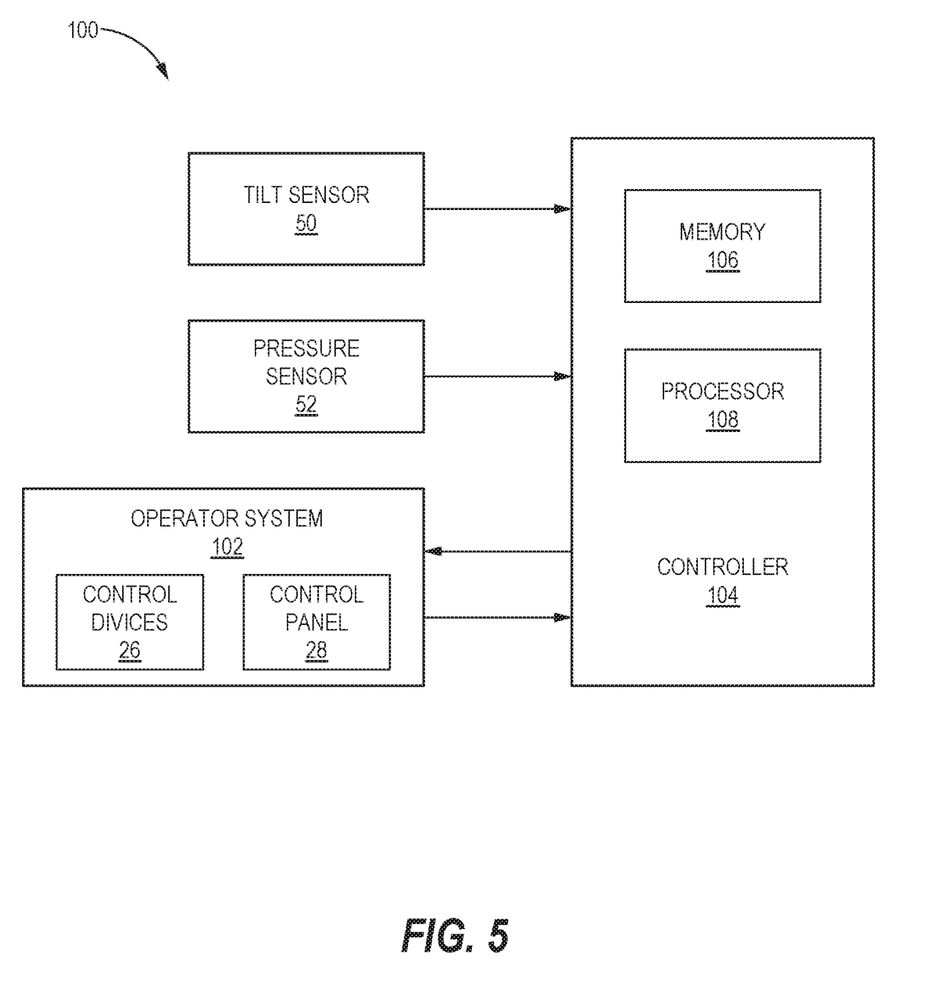
FIG. 5 is a schematic illustration of an inclination-based levelling system, in accordance with an embodiment of the present disclosure.

Referring now to FIG. 5, with continued reference to FIGS. 1-4, the inclination-based levelling system 100 includes the one or more tilt sensors 50, the plurality of pressure sensors 52, an operator system 102, and an electronic controller 104. The one or more tilt sensors 50 and the plurality of pressure sensors 52 may be in electronic communication with the controller 104, and may transmit data signals, readings, and/or sensed measurements electronically for processing. The operator system 102 may be configured to receive input from the operator of the drilling machine 10 via the one or more control devices 26 or the control panel 28, and to transmit that input to the controller 104. The controller 104 may include any type of device or any type of component that may interpret and/or execute information and/or instructions stored within a memory 106 to perform one or more functions. For example, the controller 104 may use received information and/or execute instructions to determine a length of extension of a jack 22, 23 based on a pressure in the hydraulic jack cylinder (measured by the pressure sensors 52). In addition, the controller 104 may also determine a volume of debris 48 that may be expelled from the drilling hole 34 based on a known drill bit 32 diameter and desired depth of the drilling hole 34 depth.

The memory 106 may include a random access memory ("RAM"), a read only memory ("ROM"), and/or another type of dynamic or static storage device (e.g., a flash, magnetic, or optical memory) that stores information and/or instructions for use by the example components, including the information and/or instructions used by the controller 104. Additionally, or alternatively, the memory may include non-transitory computer-readable medium or memory, such as a disc drive, flash drive, optical memory, read-only memory (ROM), or the like. The memory may store the information and/or the instructions in one or more data structures, such as one or more databases, tables, lists, trees, etc. The controller 104 may also include a processor 108 (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.), and/or any other hardware and/or software.

The controller 104 may also transmit, via a network (not shown), information regarding the pressure exerted on the hydraulic jack cylinders, as well as calculated values such a volume of debris. For example, the controller 104 may be configured to provide output to the operator system 102 for display on the control panel 28 or other display that may be visible by the operator of the drilling machine 10, but which may also be visible by machine technicians, and others with access to the inclination-based levelling system 100.

INDUSTRIAL APPLICABILITY

In practice, the teachings of the present disclosure may find applicability in many industries including, but not limited to, drilling and mining equipment. For example, the present disclosure may be beneficial to mobile drills, fixed platform drills, blast-hole drills, rotary drills, and any other machine with a frame that is levelled using a plurality of jacks. It may be particularly useful in machines that are used on uneven terrain, and to prevent fallback during drilling operations.

Figure 6:
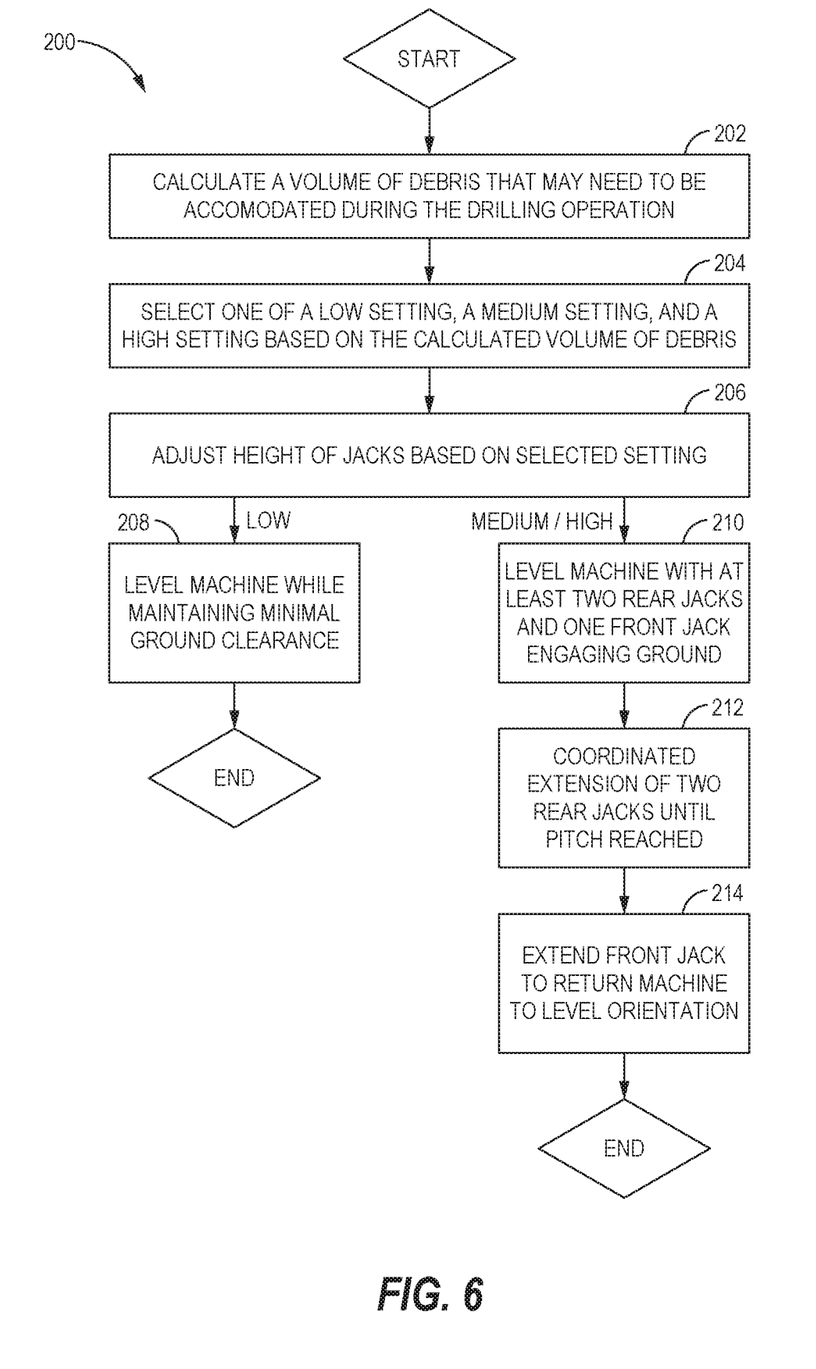
FIG. 6 is a flowchart illustrating a method of levelling a drilling machine, in accordance with the present disclosure.

A series of steps 200 involved in selecting a high, medium or low setting position, as well as levelling the drilling machine 10 according to the selected setting position is illustrated in FIG. 6. The series of steps 200 may be performed by the controller 104, although at step 204, the operator of the drilling machine 10 may override the setting position determined by the controller. In a first step 202, data relating to the drilling operation, including a diameter of the drill bit 32, a desired drilling hole 34 depth, the type of material the drilling machine 10 is drilling into, the downward speed of the drill bit, the rotational speed of the drill bit, among other data may be used by the controller 104 to calculate a volume of debris that may be expelled from the drilling hole 34 during the drilling operation.

Based on the calculated volume of debris, the controller 104 may select one of a low setting position, a medium setting position, and a high setting position for the drilling machine 10 to accommodate the debris (step 204). To accomplish this, the controller 104 may first compare the calculated volume of debris to predetermined volume ranges or thresholds associated with each of the low, medium and high setting positions. The predetermined volume ranges or threshold values may be stored in the memory 106 associated with controller 104, and may be set or adjusted by the operator of the drilling machine, machine technicians and/or other work site personnel. If the calculated volume of debris is a value at, or below, a predetermined low threshold, then the controller 104 may select the low setting position. Conversely, if the value is at, or above, a predetermined high threshold, then the controller 104 may select the high setting position. Finally, if the value is between the predetermined low threshold and the predetermined high threshold, then the controller 104 may select the medium setting position. Optionally, the controller 104 may transmit the selected setting position to the control panel 28 of the operator system 102, for viewing or approval by the operator of the drilling machine 10. The operator of the drilling machine 10 may be presented with the option to override the setting position selected by the controller 104.

Once the setting position is selected, the controller 104 may adjust the height of the jacks 22, 23 based on the selected setting position (step 206). Specifically, at step 208, if the low setting position is selected, the controller 104 may extend one or more jacks 22, 23 such that the frame 14 of the drilling machine 10 forms a level horizontal plane, while ensuring the drilling machine remains as close to the ground or work surface 12 as possible. In this position, the ground engaging mechanisms 20 may contact the work surface, or may be elevated slightly above the work surface. The low setting may ensure a horizontal leveling of the frame 14 of the drilling machine 10, and may include firm ground contact of at least two rear jacks 22, and one front jack 23.

To ensure proper leveling and height, data from each pressure sensor 52 in each jack 22, 23 may be measured and transmitted to the controller 104. More specifically, each pressure sensor 52 may measure the hydraulic fluid pressure exerted in a hydraulic fluid line connected to the hydraulic jack cylinder in each jack 22, 23. The pressure sensors 52 may transmit this data (collectively referred to hereinafter as "pressure data") to the controller 104. The controller 104 may use the pressure data, among other things, to determine whether the jacks 22, 23 have been extended far enough to engage the work surface 12.

If the middle or high setting position is selected, a three-phase (steps 210-214) process is performed by the controller 104. First, similar to step 208, the controller 104 receives the pressure data, and uses that data to level the drilling machine, such that the frame 14 forms a horizontal plane, and at least two rear jacks 22 and at least one front jack 23 firmly engage the work surface 12 (step 210).

Next, in step 212, the controller 104 extends the rear jacks 22 of the drilling machine 10 in a coordinated way to keep the roll of the drilling machine close to zero, until a certain pitch towards the front is reached. During this step, pitch and roll data is continuously transmitted from the at least one tilt sensor 50 to the controller 104. As the rear jacks 22 of the drilling machine 10 are extended, the controller 104 monitors the value of the roll data received from the tilt sensor 50, and adjusts the extension of each of the rear jacks 22 to maintain a zero roll value. At the same time, the value of the pitch data received from the tilt sensor 50 is compared to first and second predetermined front pitch values. The first and second predetermined front pitch values may be stored in the memory 106 associated with controller 104, and may be set or adjusted by the operator of the drilling machine, machine technicians and/or other work site personnel. In the medium setting position, the controller 104 continues to extend the rear jacks 22 until the value of the pitch data equals the first predetermined front pitch value. In the high setting position, the controller 104 continues to extend the rear jacks 22 until the value of the pitch data equals the second predetermined front pitch value. The first pitch value may be a smaller angle than the second pitch value, since in the high setting position, the rear jacks 22 are extended further, increasing the pitch with respect to the front portion of the drilling machine. Once the predetermined front pitch value is reached, the front jack 23 is extended to return the drilling machine 10 to a horizontally level orientation (step 214), and the drilling operation may commence.

In an alternative embodiment, when a high setting position is selected, the jacks 22, 23 may be extended until the second predetermined front pitch value is reached and/or until at least one jack reaches a maximum extension. In this embodiment, after step 210 is performed, the controller 104 begins extending the jacks 22, 23 while monitoring the pressure data received from the pressure sensors 52 and the value of the roll data received from the tilt sensor 50. The controller 104 may continue to extend the rear jacks 22 until the value of the pitch data reaches a predetermined front pitch value, and/or the pressure data indicates at least one of the jacks 22, 23 has reached a maximum stroke. Once either or both of these conditions are met, the front jack 23 is extended to return the drilling machine 10 to a horizontally level orientation.

In another arrangement, the drilling machine may include two or more front jacks 23. In this embodiment, once the predetermined front pitch value has been reached, the two or more front jacks 23 may be extended in a coordinated manner when bringing the drilling machine 10 back to a horizontal, level position, and using the pressure data, the controller 104 may equalize the pressure across all the front jacks.

While a series of steps and operations have been described herein, those skilled in the art will recognize that these steps and operations may be re-arranged, replaced, or eliminated, without departing from the spirit and scope of the present disclosure as set forth in the claims.

Furthermore, while aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A drilling machine with an inclination-based levelling system, the drilling machine comprising:
    a frame including a front portion and a rear portion,
    a tilt sensor coupled to the frame,
    a plurality of support jacks including a pair of rear support jacks proximate the rear portion of the frame and a front support jack proximate the front portion of the frame, each support jack being retractable and extendable, wherein each of the plurality of support jacks includes a hydraulic cylinder coupled to a hydraulic fluid system of the drilling machine,
    a plurality of support jacks including a pair of rear support jacks proximate the rear portion of the frame and a front support jack proximate the front portion of the frame, each support jack being retractable and extendable, wherein each of the plurality of support jacks includes a hydraulic cylinder coupled to a hydraulic fluid system of the drilling machine,
    a plurality of pressure sensors, each pressure sensor coupled to one of the plurality of hydraulic cylinders,
    a sensor configured to monitor and transmit sensor data, the sensor data including at least one of a roll of the drilling machine and a pressure; and
    a controller, including a processor, the controller operatively associated with the sensor, the controller configured to calculate a volume of debris to be produced during an operation of the drilling machine, to select a machine height setting based on the calculated volume of debris, and to extend and retract the plurality of support jacks according to the selected machine height setting using the sensor data wherein the machine height setting is one of a low setting, a medium setting, and a high setting.

2. The drilling machine of claim 1, further including a plurality of ground engaging mechanisms, wherein when the selected machine height setting is the low setting, the controller extends the plurality of support jacks such that the plurality of ground engaging mechanisms maintain contact with a work surface.

3. The drilling machine of claim 1, further including a tilt sensor operatively associated with the controller and configured to monitor and transmit a pitch angle of the frame of the drilling machine with respect to a work surface, wherein when the selected machine height setting is the medium setting, the controller extends the pair of rear support jacks until the pitch angle reaches a first predetermined pitch angle.

4. The drilling machine of claim 3, wherein when the selected machine height setting is the high setting, the controller extends the pair of rear support jacks until the pitch angle reaches a second predetermined pitch angle.

5. The drilling machine of claim 4, wherein the first predetermined pitch angle is smaller than the second predetermined pitch angle.

6. An inclination-based levelling system for a drilling machine including a frame and a plurality of support jacks, the inclination-based levelling system comprising:
    a sensor configured to monitor and transmit sensor data, the sensor data including at least one of a roll of the drilling machine and a pressure; and
    a controller, including a processor, in operative communication with the sensor, the controller configured to:
        calculate a volume of debris to be produced during an operation of the drilling machine;
        select a machine height setting based on the calculated volume of debris;
        receive the sensor data transmitted by the sensor;
        extend and retract the plurality of support jacks according to the selected machine height setting using the received sensor data; and
        transmit the selected machine height setting to an operator of the drilling machine, and wherein the operator of the drilling machine may override the selected machine height setting with a different machine height setting, wherein the machine height setting is one of a low setting, a medium setting, and a high setting.

7. The inclination-based levelling system of claim 6, wherein when the controller selects the low setting, the controller extends the plurality of support jacks until each support jack engages a work surface, and the controller levels the frame of the drilling machine.

8. The inclination-based levelling system of claim 6, wherein when the controller selects the medium setting, the controller levels the frame of the drilling machine, then extends a pair of support jacks proximate to a rear portion of the frame until a predetermined pitch is reached at a front portion of the frame, then the controller extends a front support jack until the frame of the drilling machine is level.

9. The inclination-based levelling system of claim 6, wherein when the controller selects the high setting, the controller levels the frame of the drilling machine, then extends the plurality of support jacks until the sensor data indicates at least one support jack has reached an end of stroke.

* * * * *

UNITED STATES PATENT AND TRADEMARK OFFICE
CERTIFICATE OF CORRECTION

| | | |
|---|---|---|
| PATENT NO. | : 11,885,222 B2 | Page 1 of 1 |
| APPLICATION NO. | : 17/034936 | |
| DATED | : January 30, 2024 | |
| INVENTOR(S) | : Glover et al. | |

It is certified that error appears in the above-identified patent and that said Letters Patent is hereby corrected as shown below:

In the Claims

Column 9 Lines 38-44, delete "a plurality of support jacks including a pair of rear support jacks proximate the rear portion of the frame and a front support jack proximate the front portion of the frame, each support jack being retractable and extendable, wherein each of the plurality of support jacks includes a hydraulic cylinder coupled to a hydraulic fluid system of the drilling machine,"

Signed and Sealed this
Twenty-second Day of April, 2025

Coke Morgan Stewart
*Acting Director of the United States Patent and Trademark Office*